(12) United States Patent
Wu et al.

(10) Patent No.: US 6,590,432 B1
(45) Date of Patent: Jul. 8, 2003

(54) LOW-VOLTAGE DIFFERENTIAL DRIVER WITH OPENED EYE PATTERN

(75) Inventors: Ke Wu, San Jose, CA (US); Michael Y. Zhang, Palo Alto, CA (US)

(73) Assignee: Pericom Semiconductor Corp., San Jose, CA (US)

( * ) Notice: Subject to any disclaimer, the term of this patent is extended or adjusted under 35 U.S.C. 154(b) by 0 days.

(21) Appl. No.: 10/065,222

(22) Filed: Sep. 26, 2002

(51) Int. Cl.[7] ............................................. H03K 3/00
(52) U.S. Cl. ........................ 327/108; 327/112; 326/83
(58) Field of Search ...................... 327/108–112, 434, 327/436, 437; 326/62, 63, 82, 83

(56) References Cited

U.S. PATENT DOCUMENTS

| | | | |
|---|---|---|---|
| 5,404,051 A | 4/1995 | Kobayashi et al. | 327/170 |
| 5,632,019 A | 5/1997 | Masiewicz | 713/300 |
| 5,659,260 A | 8/1997 | Kajimoto et al. | 327/55 |
| 5,767,699 A | 6/1998 | Bosnyak et al. | 326/86 |
| 5,856,757 A | 1/1999 | Eschauzier | 327/553 |
| 5,872,446 A * | 2/1999 | Cranford, Jr. et al. | 323/315 |
| 6,049,229 A | 4/2000 | Manohar et al. | 326/60 |
| 6,051,990 A | 4/2000 | Uber | 326/33 |
| 6,218,884 B1 | 4/2001 | Chiu | 327/376 |
| 6,246,270 B1 | 6/2001 | Wang et al. | 327/111 |
| 6,252,435 B1 | 6/2001 | Wu | 327/65 |
| 6,281,715 B1 | 8/2001 | DeClue et al. | 327/65 |
| 6,285,232 B1 | 9/2001 | Hasegawa | 327/321 |
| 6,285,256 B1 | 9/2001 | Wong | 330/255 |
| 6,288,576 B1 | 9/2001 | Casier | 327/65 |
| 6,288,581 B1 | 9/2001 | Wong | 327/108 |
| 6,380,797 B1 | 4/2002 | Macaluso et al. | 327/513 |
| 6,424,217 B1 | 7/2002 | Kwong | 330/253 |

* cited by examiner

Primary Examiner—Kenneth B. Wells
(74) Attorney, Agent, or Firm—Stuart T. Auvinen

(57) ABSTRACT

A differential output buffer has a primary stage and a secondary stage that each directly drive differential outputs. Link transistors between the secondary stage and the differential outputs are eliminated. The primary stage continuously receives differential inputs applied to gates of n-channel sourcing and sinking transistors. The sources of the sourcing transistors and the drains of the sinking transistors are connected to the true and complement differential outputs. The secondary stage also has n-channel sourcing and sinking transistors directly connected to the differential outputs. Pulsed inputs applied to secondary-stage gates are normally low, disabling the sourcing and sinking transistors in the secondary stage to disable the secondary stage. However, during a switching transient, the pulsed inputs are pulsed on, allowing the secondary stage to drive a boost current to the differential outputs. This boost current sharpens rise and fall edges to compensate parasitic capacitances, opening the eye pattern.

20 Claims, 7 Drawing Sheets

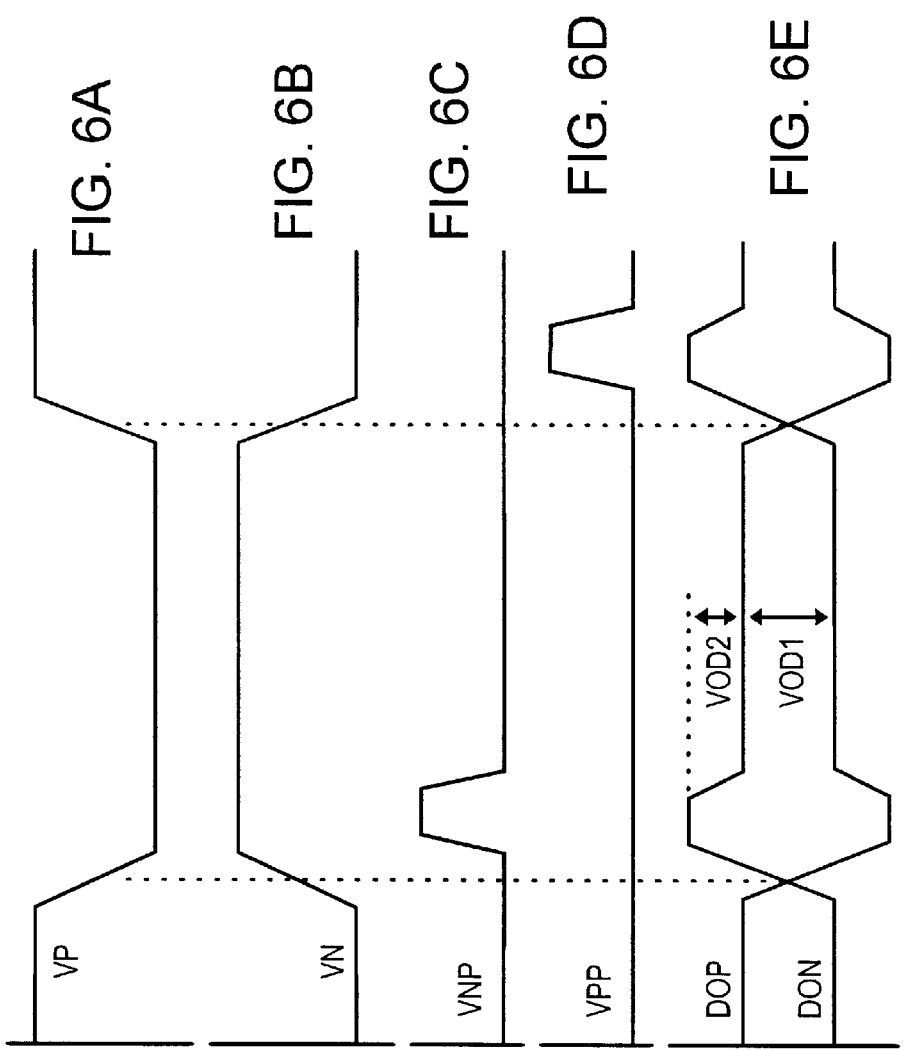

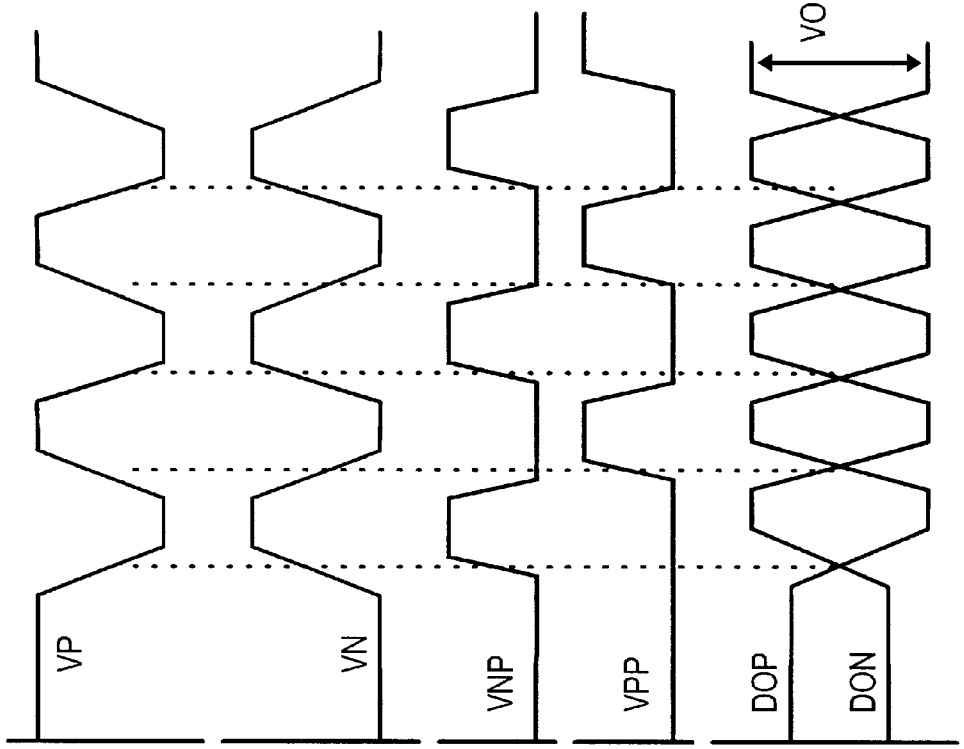

LOW-VOLTAGE DIFFERENTIAL DRIVER WITH OPENED EYE PATTERN

BACKGROUND OF INVENTION

This invention relates to CMOS differential buffers, and more particularly to low-voltage differential-signaling (LVDS) output buffers.

High-speed signaling can be a key to increased performance for networks, computers, telecom, and other electronic systems. External signaling can often limit performance, such as when signals are driven from an integrated circuit (IC) to another IC. External signals often drive higher capacitive and resistive loads than do internal signals.

While full-swing signaling is still used internally in IC's, more recently off-chip signaling has employed limited-voltage swings. Rather than swing the output a full rail-to-rail voltage such as 3.3 volts, the outputs swing only 350 milli-volts (mV) or so.

Two output signals per bit of information are used, rather than just one output.

The two outputs are driven to opposite states, in what is known as differential signaling. When one output swings up 175 mV, the other swings down 175 mV. The two differential signals can be connected together by a resistor at the far end of a cable driven by the outputs to produce a voltage difference when current-switching output drivers are used.

Such low-voltage differential signaling (LVDS) techniques can speed data rates and reduce electro-magnetic interference (EMI), even when long cables are driven.

FIG. 1 is a schematic diagram of a basic low-voltage differential signaling (LVDS) output buffer. Current-steering buffer 10 receives differential inputs V+, V− and generates differential outputs DOP, DON. Input V+ is applied to the gates of n-channel transistors 22, 36, while input V− is applied to the gates of n-channel transistors 32, 26.

When V+ rises and V− falls in voltage, transistors 22, 36 are turned on more strongly while transistors 32, 26 are turned off strongly. This pulls the voltage of DON lower, and DOP higher.

Current-source p-channel transistor 28 acts as a current source controlled by its gate bias, PBIAS. Likewise, current-sink n-channel transistor 38 is controlled by its gate bias, NBIAS, and sinks about 3.5 mA in one embodiment. Source resistor 24 can be placed in series with current-source p-channel transistor 28.

When full-swing voltages are input for V+, V−, the full 3.5 mA of current is switched to either DOP or DON. For example, when Vcc is 3.3 volts, and V+ is driven high to 3.3 volts while V− is driven low to ground, n-channel transistors 32, 26 turn off, while n-channel transistors 22, 36 are on strongly. All the current from current-source p-channel transistor 28 flows through n-channel transistor 32 to output DOP, while n-channel transistor 36 sinks current from DON through current-sink n-channel transistor 38.

An external load resistor (not shown) is typically connected between DOP, DON at the far end of a cable driven by buffer 10. This load resistor produces a voltage between DOP, DON. As buffer 10 switches current among DOP, DON, the voltage on the load resistor varies and can be sensed by a differential sense amplifier or input on a receiver. For example, a 100-ohm load resistor generates a 0.35-volt IR drop when 3.5 mA of current flows from DON to DOP.

FIGS. 2A–C are waveforms illustrating operation of the LVDS buffer of FIG. 1. In FIG. 2A, an upstream input VIN switches from low-to-high and later back from high-to-low. This input VIN is converted to differential input signal V+, V− by standard logic to generate V+, V−. These are full-swing differential inputs, as shown in FIG. 2B.

FIG. 2C shows the differential outputs DOP, DON produced by buffer 10 of FIG. 1, when the differential inputs V+, V− of FIG. 2B are applied. The vertical (voltage) scale is enlarged in FIG. 2C, since VOH and VOL typically differ by only a few hundred mV, such as 350 mV (0.35 volt).

When differential inputs V+, V− switch, current is switched among the DOP, DON outputs, causing a switching of outputs DOP, DON around the common-mode voltage VOS. The voltage difference, VOD, generated across the load resistor is the resistance multiplied by the current switched, I*R. For a 100-ohm resistor and a 3.5-mA current, VOD is 350 mV.

The switching waveform of FIG. 2C is known as an eye pattern, since the opening between DOP and DON has an appearance similar to the shape of a human eye. The height of the eye opening is voltage difference VOD. When an actual circuit that drives a real cable is viewed using an oscilloscope or test analyzer, the waveforms of many cycles are superimposed on one another. The lines for DOP and DON then may appear fuzzy with a larger thickness. Distortions can occur, further reducing the opening of the eye pattern due to jitter and noise of the cable environment.

At very high frequencies, such as about 0.5-GigaHz, the height of the eye (VOD) can decrease significantly. When DOP is driven high at these high frequencies, it is kept lower in voltage than at low frequencies due to a parasitic capacitance.

Coupling between V− and DOP occurs across the drain-to-gate parasitic capacitance of n-channel transistor 26. As V− falls in voltage, the rise in DOP is reduced by capacitive coupling across this parasitic gate-to-drain and drain to ground capacitor. This parasitic capacitor effect is more pronounced at higher frequencies. This limits operation at higher frequencies.

The eye pattern can be improved by using pre-emphasis techniques. When the output is first switched, a boosted current is used to initially increase the voltage difference. Then the current boost ends, and the voltage difference decreased to the normal value. The height of the eye is thus increased at the beginning (left side) of the eye when pre-emphasis is added.

An increased voltage difference at the beginning of the eye pattern can improve performance, since any distortions can be compensated by the larger voltage difference. At high frequencies when the parasitic capacitance reduces the voltage difference, pre-emphasis compensates by increasing the voltage difference.

Current-Boost Stage Adds Pre-emphasis—FIG. 3

FIG. 3 is a schematic of a prior-art LVDS output buffer with a current-boost stage for pre-emphasis. See U.S. Pat. No. 6,288,581 by Wong and assigned to Pericom Semiconductor Corp. of San Jose, Calif. Primary buffer 11 steers current to outputs VOP, VON using transistors 22, 26 that receive V+, and transistors 32, 36 that receive V−.

Boost stage 20 is similar to primary buffer 11, except that a smaller current is switched. Current is switched in a similar manner, with input V+ applied to the gates of p-channel transistor 42 and n-channel transistor 46, while V− is applied to the gates of p-channel transistor 52 and n-channel transistor 56.

Enable signal ENA is kept high when output signals VOP, VON are driven, so n-channel transistors 44, 54 in boost stage 20 remain on, as do n-channel transistors 25, 34 in primary-stage buffer 11.

Link Transistors Between Stages Slow Boost N-channel link transistors 60, 62 connect the outputs of the two stages 11, 20. Link transistor 60 allows the current from boost stage 20 to flow to output VOP, while link transistor 62 allows the current from boost stage 20 to flow to output VON.

Primary stage buffer 11 is always connected to outputs VOP, VON, while boost stage 20 is connected only when link transistors 60, 62 are enabled.

The gates of link transistors 60, 62 are driven by boost signal PREX. When boost signal PREX is high, the current from boost stage 20 is added to the current from primary-stage buffer 11, increasing the output current. When boost signal PREX is low, only primary-stage buffer 11 drives the outputs.

Boost signal PREX is timed to increase current during and immediately after switching, but to return to normal current levels after a time delay. This timing provides a pre-emphasis period, when boost signal PREX is active. During the pre-emphasis period, current is increased, since boost stage 20 is coupled to switch additional current to outputs VOP, VON.

Unfortunately, a series resistance between boost stage 20 and the VOP, VON outputs is produced by link transistors 60, 62. This series resistance is undesirable as it can decrease the effectiveness of the boost current, adding delay and an I-R voltage drop. Especially at higher frequencies this added series resistance can degrade performance. Elimination of this series resistance is desirable, as is the removal of enable n-channel transistors 25, 34, 44, 54.

BRIEF DESCRIPTION OF DRAWINGS

FIGS. 6A–E are waveforms highlighting operation of the LVDS buffer of FIG. 4 at lower frequencies with pre-emphasis.

FIGS. 7A–E are waveforms highlighting operation of the LVDS buffer of FIG. 4 at high frequencies.

DETAILED DESCRIPTION

The present invention relates to an improvement in current-boosting low-voltage differential signaling (LVDS) drivers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that the series resistance from the link transistors can be eliminated, allowing better high-frequency performance. Separate V+, V– inputs are generated for the primary and secondary stages. The primary stage is driven continuously with V+, V– differential inputs to provide D.C. current to the differential outputs, while the secondary stage's inputs are pulsed to provide the boost current.

The V+, V– inputs are gated with a pulse generator to pulse the secondary stage on and off.

Figure 1:
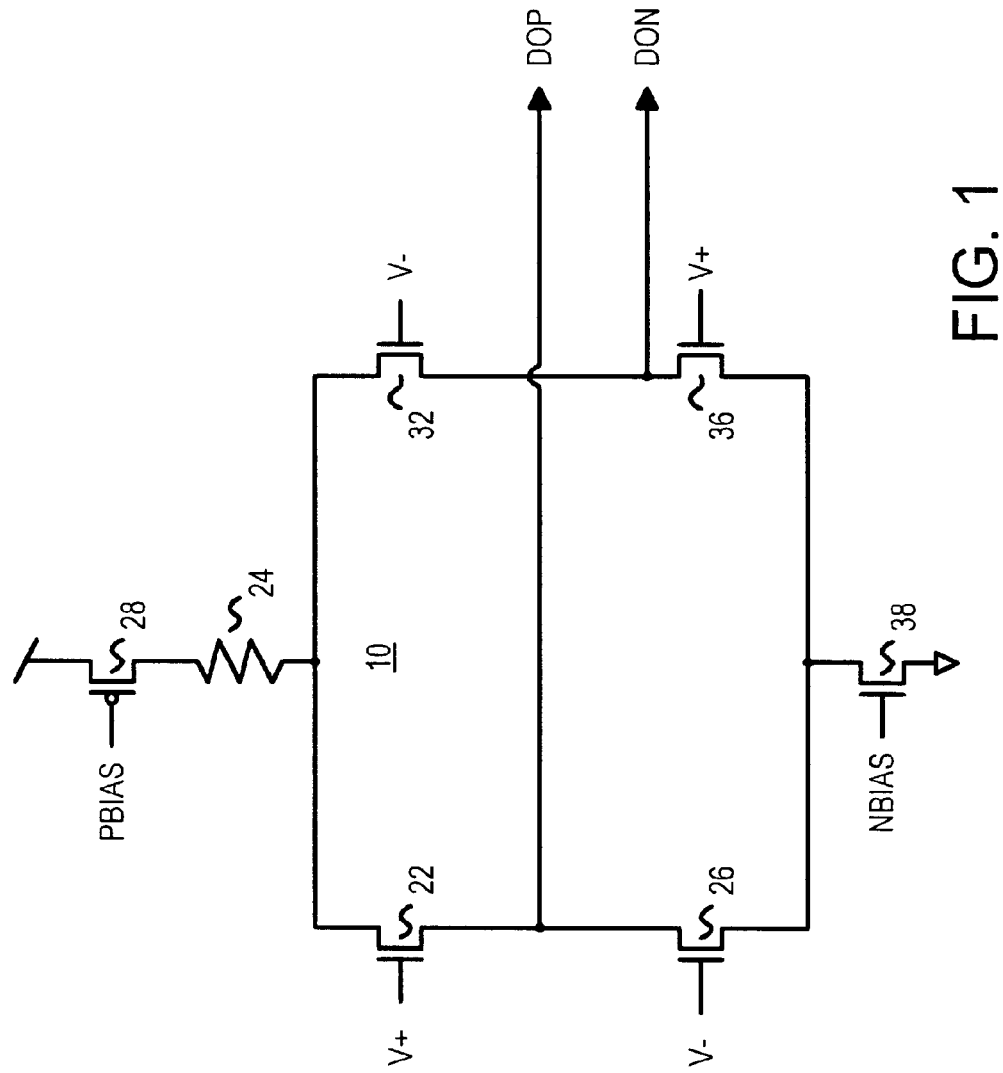
FIG. 1 is a schematic diagram of a basic low-voltage differential signaling (LVDS) output buffer.
Figure 2A:
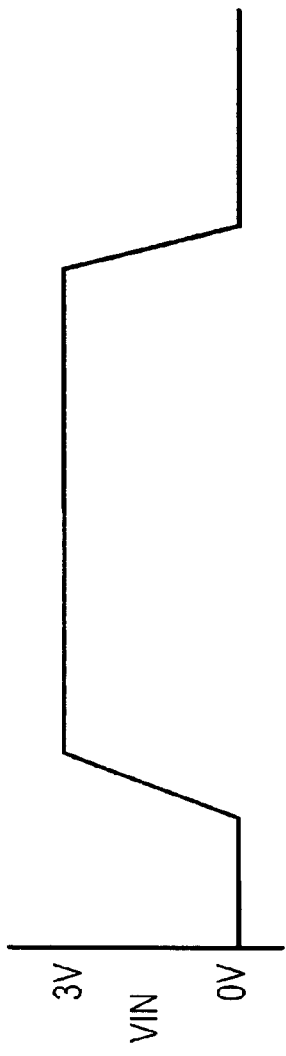
FIGS. 2A–C are waveforms illustrating operation of the LVDS buffer of FIG. 1.
Figure 2B:
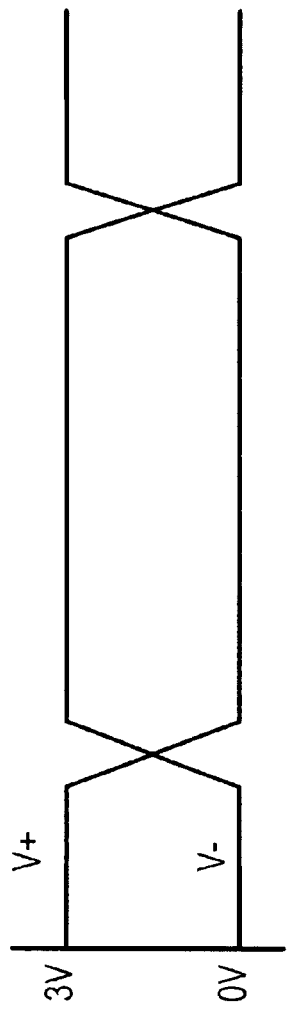
Figure 2C:
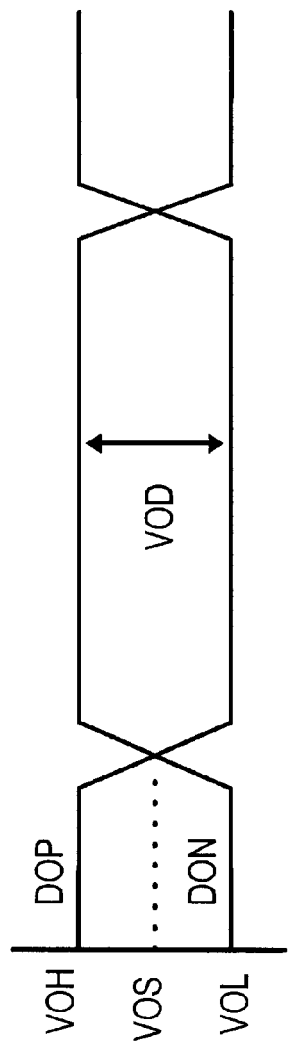
Figure 3:
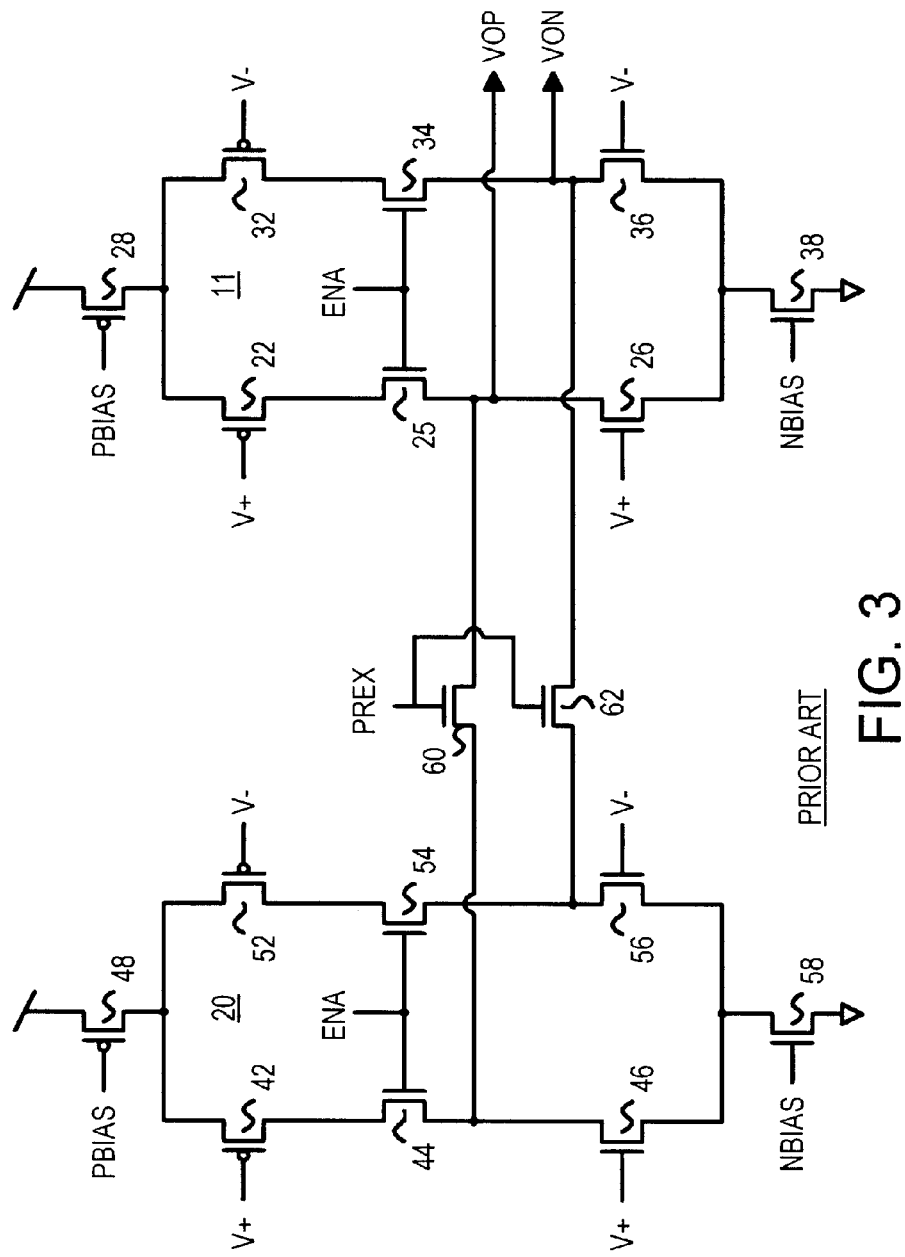
FIG. 3 is a schematic of a prior-art LVDS output buffer with a current-boost stage for pre-emphasis.
Figure 4:
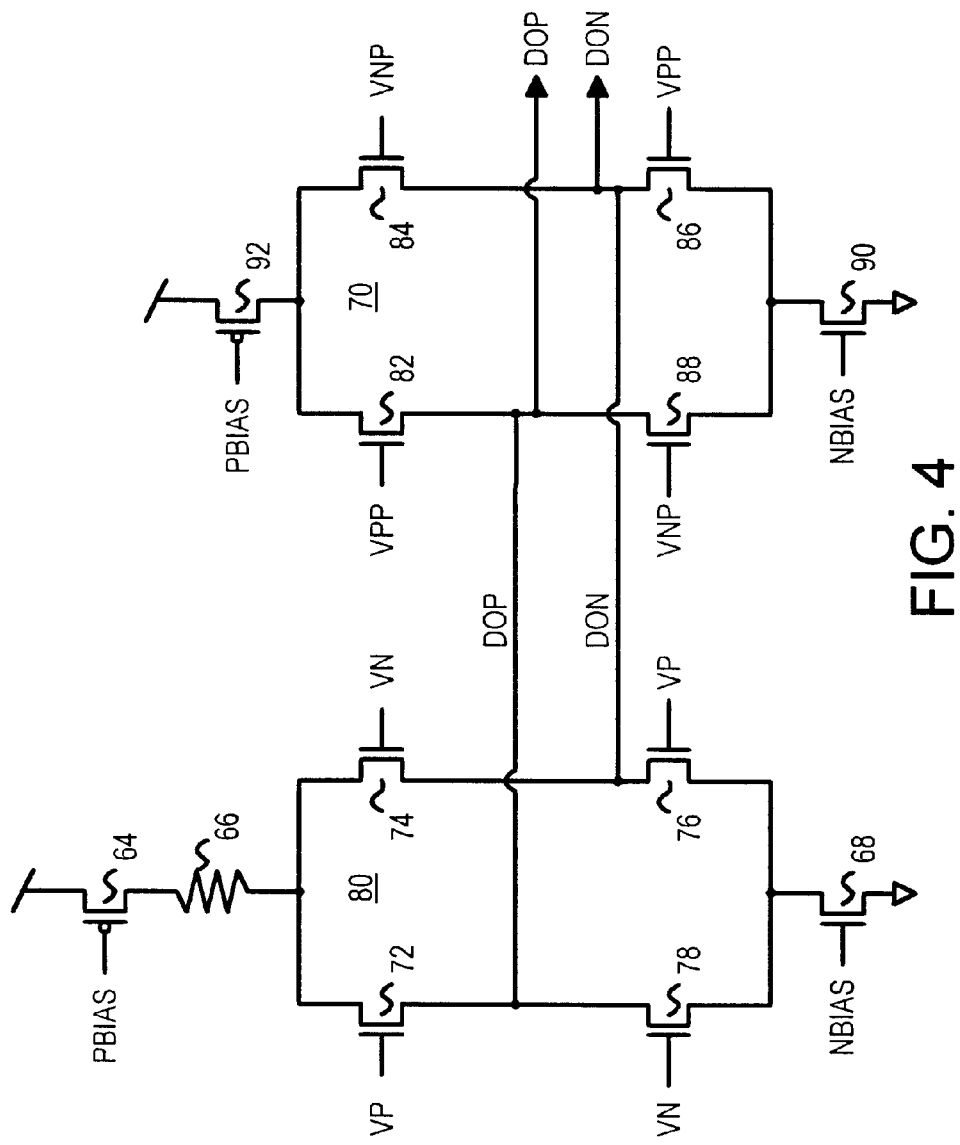
FIG. 4 is a schematic of a LVDS output buffer with a boost current provided by a secondary stage that receives pulsed differential inputs.

FIG. 4 is a schematic of a LVDS output buffer with a boost current provided by a secondary stage that receives pulsed differential inputs. Two stages, primary stage 80 and secondary stage 70, are each directly coupled to the differential outputs. Since linking transistors are eliminated, a large series resistance is avoided between the secondary stage 70 and the differential outputs.

Primary stage 80 provides a continuous current to differential outputs DOP, DON, allowing the output buffer to meet the D.C specifications for low-frequency or static conditions. Differential inputs VP, VN are generated from V+, V– input signals and are not gated by the pulse generator.

Secondary stage 70 provides the temporary boost current during a transition of the DOP, DON differential outputs, allowing these outputs to switch more quickly. Once switching is completed, this boost current is stopped and only primary stage 80 drives outputs DOP, DON.

Secondary stage 70 receives pulsed differential inputs VPP, VNP, which are activated for only a short period of time during switching. Once switching is over, inputs VPP and VNP are both driven low, disabling current flow in secondary stage 70. Note that while VP, VN are differential inputs, VPP, VNP are not truly differential inputs since both are low after switching is competed.

In primary stage 80, p-channel current-source transistor 64 has its gate driven by a bias voltage PBIAS which sets the current source. Source resistor 66 can be included to limit the source current and provide a voltage drop.

Current from p-channel current-source transistor 64 and source resistor 66 is applied to the drains of n-channel sourcing transistors 72, 74. The source of n-channel sourcing transistor 72 is connected to the drain of n-channel sinking transistor 78 and directly to the DOP output. The source of n-channel sourcing transistor 74 is connected to the drain of n-channel sinking transistor 76 and directly to the DON output.

The gates of n-channel source transistor 72 and n-channel sinking transistor 76 are driven by VP, while the gates of n-channel source transistor 74 and n-channel sinking transistor 78 are driven by VN. Current is steered toward DOP, pulling DOP higher, when VP is higher than VN since n-channel sourcing transistor 72 sources more current to DOP than n-channel sourcing transistor 74 sources to DON, assuming matched transistors 72, 74. Also, more current is sunk through n-channel sinking transistor 76 than n-channel sinking transistor 78 when VP is higher, pulling DON lower.

The sources of n-channel sinking transistors 76, 78 are connected together and the drain of n-channel current-sink transistor 68. Another bias voltage, NBIAS, is applied to the gate of n-channel current-sink transistor 68 to set the current sink. Voltage biases PBIAS, NBIAS can be set by a transistor-based voltage divider, or by other methods such as band-gap or external references. These bias voltages are usually between power and ground and at least a threshold away from power or ground.

Secondary stage 70 directly drives differential outputs DOP, DON without a series resistance from a linking transistor. P-channel current-source transistor 92 also receives bias PBIAS at its gate, and sources current to the drains of n-channel sourcing transistors 82, 84. The sources of sourcing transistors 82, 84 are connected to the drains of n-channel sinking transistors 88, 86, respectively. The sources of n-channel sinking transistors 86, 88 are connected together and to the drain of n-channel current-sink transistor 90, which has its gate connected to bias NBIAS.

Pulsed differential input signals are applied to secondary stage 70. Pulsed V+ input VPP is applied to the gates of n-channel sourcing transistor 82 and n-channel sinking transistor 86, while the pulsed V− input, VNP, is applied to the gates of n-channel sourcing transistor 84 and n-channel sinking transistor 88.

When the differential outputs are not being switched, pulsed inputs VPP, VNP are held at a low voltage, such as ground. This turns off n-channel sourcing transistors 82, 84, disconnecting current-source transistor 92 from the differential outputs DOP, DON. Also, n-channel sinking transistors 86, 88 are turned off, disconnect current-sink transistor 90 from the differential outputs DOP, DON. Thus secondary stage 70 is in a high-impedance state when VPP and VNP are both low. The current source and sink of secondary stage 70 are disconnected from the differential outputs when VPP and VNP are low.

During switching of the differential outputs, one of VPP, VNP is pulsed high. For example, when DOP is to be switched high and DON low, VPP is pulsed high while VNP remains low. The high VPP pulse is applied to the gate of n-channel sourcing transistor 82, which drives the boost current from p-channel current-source transistor 92 to output DOP, pulling it high more quickly. The high VPP pulse is also applied to the gate of n-channel sinking transistor 86, which sinks the boost current from output DON to n-channel current-sink transistor 90, pulling DON low more quickly. Since VNP is still low, n-channel sourcing transistor 84 and n-channel sinking transistor 88 remain off, allowing all of the boost current to be directed to the switching outputs.

The added boost current from secondary stage 70 steepens the rise and fall edges of the differential outputs DOP, DON. The eye pattern is opened by this steepening of the edges.

Figure 5:
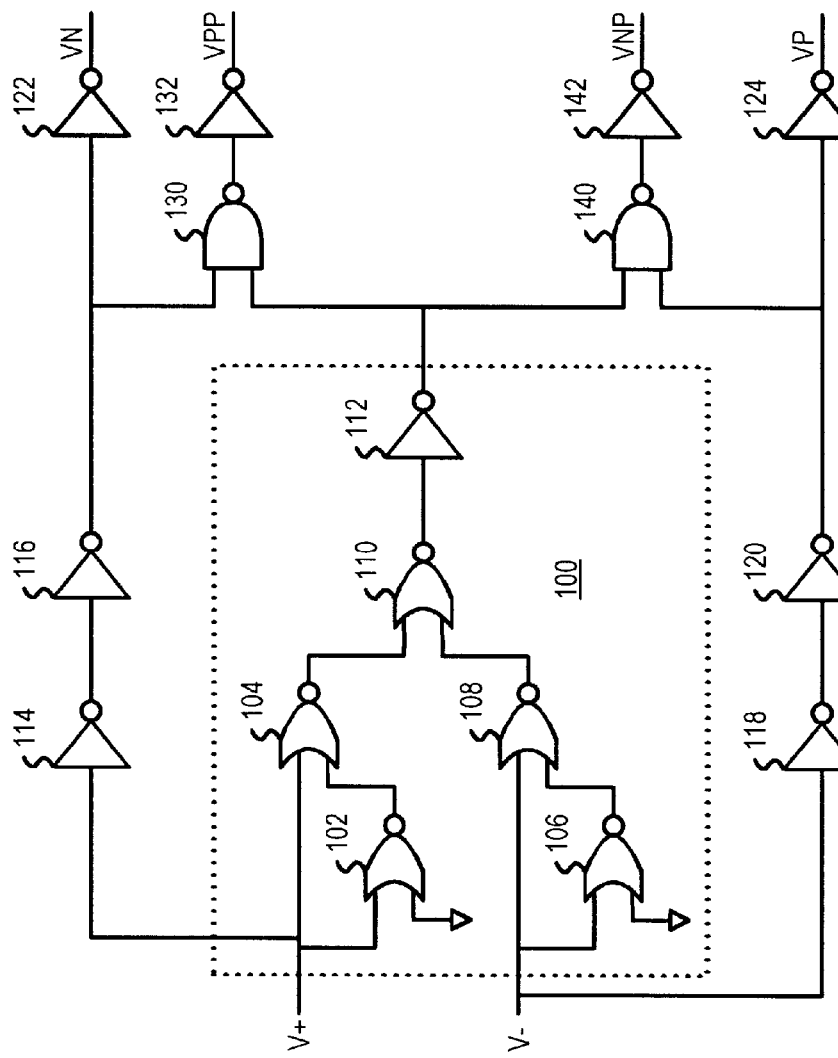
FIG. 5 is a diagram of a pre-driving circuit that generates signals to the primary and secondary stages.

Pre-driving Circuit—FIG. 5

FIG. 5 is a diagram of a pre-driving circuit that generates signals to the primary and secondary stages. Pulse generator 100 generates a high-going pulse at the output of inverter 112 when either of differential inputs V+ or V− transitions from low-to-high.

Differential input V+ is buffered and inverted by inverters 114, 116, 122 to drive non-pulsed input VN to primary stage 80 of FIG. 4. Likewise, differential input V− is buffered and inverted by inverters 118, 120, 124 to generate non-pulsed input VP to primary stage 80. The differential inputs VP, VN to primary stage 80 thus follow differential inputs V+, V−.

When either V+ or V− transitions low, a high-going pulse is generated by pulse generator 100 on the output of inverter 112. This high-going pulse is applied to an input of each of NAND gates 130, 140, enabling them to invert their other input.

When V− goes low and V+ is high, the upper input of NAND gate 130 is high, and NAND gate 130 drives a low to inverter 132, which drives pulsed input VPP high. Once pulse generator 100 ends the high pulse, the other input to NAND gate 130 goes low, forcing its output high and VPP low again. Thus a pulse is generated on VPP when V− goes low and V+ goes high. VNP remains low since the lower input to NAND gate 140 is low.

When V+ goes low and V− is high, the lower input of NAND gate 140 is high, and NAND gate 140 drives a low to inverter 142, which drives pulsed input VNP high. Once pulse generator 100 ends the high pulse, the other input to NAND gate 140 goes low, forcing its output high and VNP low again. Thus a pulse is generated on VNP when V− goes low and V+ goes high. VPP remains low since the upper input to NAND gate 130 is low.

When no transition occurs on V+, V−, pulse generator 100 does not generate a high-going pulse and inverter 112 drives a low to NAND gates 130, 140, forcing their outputs high and VPP, VNP low.

Pulse generator 100 operates as follows: When V+ is high, the upper input of detecting NOR gate 104 is high, forcing its output low. NOR gate 102 also receives the high V+ and drives a low to the lower input of detecting NOR gate 104. When V+ then goes low, the upper input of detecting NOR gate 104 immediately goes low, while the lower input of detecting NOR gate 104 is still low. The low-low inputs cause detecting NOR gate 104 to drive its output high, and combining NOR gate 110 drives its output low, causing the start of a high pulse on the output of inverter 112.

Once the low V+ propagates through NOR gate 102, the lower input to detecting NOR gate 104 goes high, causing detecting NOR gate 104 to drive its output low again. Both inputs to combining NOR gate 110 are again low, so it drives a high to inverter 112, which ends the high-going pulse.

NOR gates 106, 108 operate in a similar fashion to generate a high-going pulse to combining NOR gate 110 when V− goes low. The actual voltages that trip each gate and generate the pulse are determined by the logic threshold or switching voltage for each gate, which can be altered by standard design techniques such as altering ratios of p and n transistors in the gates. Schmidt trigger inputs or other enhancements can be added. The boost-current or pre-emphasis period depends on the propagation delay through NOR gates 102, 106 as well as other circuit delays and skews. Slower NOR gates 102, 106 can extends the pulse width and time that the boost current and secondary stage 70 are on.

Low-Frequency Operation—FIGS. 6

FIGS. 6A–E are waveforms highlighting operation of the LVDS buffer of FIG. 4 at lower frequencies with pre-emphasis. Differential inputs V+, V− (not shown) are buffered to generate VP, VN of FIGS. 6A, 6B.

For the first edge in the waveforms, when input V+ transitions low and VN is driven high in FIG. 6B, pulse VNP is generated in FIG. 6C. For the second edge in the waveforms, when input V+ transitions high and VP is driven high in FIG. 6A, pulse VPP is generated in FIG. 6D.

FIG. 6E shows the outputs DOP, DON on an enlarged vertical scale. When V+, V− switch, DOP and DON also switch. When VP is high and VN is low, DOP is driven high and DON is driven low. When VP is low and VN is high, DOP is driven low and DON is driven high.

The boost current is also supplied when one of the boost pulses, VPP or VNP, is high. When VP goes high, VPP is also pulsed high, allowing the boost current from the secondary stage to help drive DOP higher and DON lower. Once VPP ends, only the primary stage drives the outputs. However, most of the switching has already taken place, so the primary stage only has to hold the outputs to the specified D.C. levels, such as the differential output difference voltage VOD1.

Likewise, When VN goes high, VNP is also pulsed high, allowing the boost current from the secondary stage to help drive DON higher and DOP lower. Once VNP ends, only the primary stage continues to drive the outputs.

Since the pulsed boost signal VPP or VNP is turned on immediately after the transition, the secondary stage transistors initially couple boost currents to the outputs, which also receives the current from the primary stage buffer. Thus the current through the load resistor is boosted while VPP or VNP is high.

Once boost signal VPP or VNP ends, the sinking and sourcing transistors in the secondary stage isolate the boost currents from the DOP, DON outputs. The current through the external load resistor between DOP, DON is reduced to that of the current from the primary stage. The lowered I-R drop through the load resistor produces a smaller voltage difference VOD1 than the larger voltage difference VOD1+ 2*VOD2 produced during the pre-emphasis period.

In the example used earlier of a 100-ohm load resistor, and 3.5-mA primary current and 1-mA boost current, VOD1 is 350 mV while 2*VOD2 is 100 mV. During the pre-emphasis period, the voltage difference is increased to 450 mV from the nominal 350 mV. Noise immunity during the pre-emphasis period is improved due to the wider initial eye pattern.

High-Frequency Operation—FIGS. 7

FIGS. 7A–E are waveforms highlighting operation of the LVDS buffer of FIG. 4 at high frequencies. Differential inputs V+, V− (not shown) are buffered to generate VP, VN of FIGS. 7A, 7B.

For the first edge in the waveforms, when input V+ transitions low and VN is driven high in FIG. 7B, pulse VNP is generated in FIG. 7C. For the second edge in the waveforms, when input V+ transitions high and VP is driven high in FIG. 7A, pulse VPP is generated in FIG. 7D.

The inputs are switched at such a high frequency that the pulse width of VPP, VNP is just about as wide as the full half-periods when VP or VN is high. Thus the VPP and VNP pulses occupy the entire half-period of the inputs.

FIG. 7E shows the outputs DOP, DON on an enlarged vertical scale. When V+, V− and VP, VN switch, DOP and DON also switch. Since the boost-stage inputs VPP, VNP are turned on for the full half-period, the sourcing and sinking transistors in the secondary stage remain on and do not turn off until the next transition. Thus the current through the load resistor is boosted for many cycles.

The ideal voltage difference, 2*VOD2+ VOD1, may not obtained at high frequencies due to various parasitic effects. Instead, an intermediate voltage difference, VOD3, may be obtained. This VOD3 is still larger than the voltage difference that would be obtained if only the primary stage were driving current to the load resistor, since the current from the secondary stage is ordinarily much greater than the current lost by the parasitic capacitive coupling effects.

ALTERNATE EMBODIMENTS

Several other embodiments are contemplated by the inventors. For example, different transistor sizes and biases can be used to obtain desired currents in the two stages. The load resistance may be chosen by the system designer from a range of values. Additional devices such as capacitors can be added, and various parasitic resistances and capacitances may exist but are not shown. The pre-driver and pulse generator can be constructed in many variations, such as using NAND gates and signal inversion rather than NOR gates. Positive logic gates may be used, such as an OR gate constructed from a NOR gate and an inverter as is commonly available from standard-cell libraries. More complex multi-input gates can also be employed.

The output buffer may be disabled by driving both V+, V− or VP, VN low.

Additional gates can be provided to drive these signals low during a power-down or high-impedance mode. The source resistor can be located in series, above or below, the p-channel current-source transistor, or can be eliminated. A source resistor could also be placed in series with the p-channel current-source transistor in the secondary stage. P-channel sourcing and sinking transistors rather than n-channel could be substituted with a modified pulse generator than generates low-going pulses for VPP, VNP. Polarities can also be reversed by swapping inputs or outputs.

Additional secondary or primary stages may be included. Separate timing signals may be used to provide a gradual increase or decrease in switching currents. The voltage differences (VOD) shown are actually absolute values since current can flow in either of two directions. Of course, any advantages and benefits described may not apply to all embodiments of the invention.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. §1.72(b). Any advantages and benefits described may not apply to all embodiments of the invention. When the word "means" is recited in a claim element, Applicant intends for the claim element to fall under 35 USC §112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein performing the function and their structural equivalents, but also equivalent structures. For example, although a nail and a screw have different structures, they are equivalent structures since they both perform the function of fastening. Claims that do not use the word means are not intended to fall under 35 USC §112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A low-voltage differential signaling (LVDS) driver comprising:
    a primary stage that comprises:
    a primary current source;
    a primary current sink;
    a first primary sourcing transistor having a gate that receives a first differential input signal, for steering current from the primary current source to a first differential output;
    a second primary sourcing transistor having a gate that receives a second differential input signal, for steering current from the primary current source to a second differential output;
a first primary sinking transistor having a gate that receives the second differential input signal, for steering current from the first differential output to the primary current sink;
a second primary sinking transistor having a gate that receives the first differential input signal, for steering current from the second differential output to the primary current sink;
a secondary stage that comprises:
a secondary current source;
a secondary current sink;
a first secondary sourcing transistor having a gate that receives a first pulsed differential input signal, for steering current from the secondary current source to the first differential output;
a second secondary sourcing transistor having a gate that receives a second pulsed differential input signal, for steering current from the secondary current source to the second differential output;
a first secondary sinking transistor having a gate that receives the second pulsed differential input signal, for steering current from the first differential output to the secondary current sink;
a second secondary sinking transistor having a gate that receives the first pulsed differential input signal, for steering current from the second differential output to the secondary current sink; and
a pre-driver circuit, receiving a pair of differential inputs, for buffering the pair of differential inputs to continuously generate the first and second differential input signals, and for pulsing one of the first and second pulsed differential inputs signals in response to a transition of the pair of differential inputs, whereby the primary stage continuously steers current but the secondary stage is pulsed on and off by the first and second pulsed differential input signals.

2. The LVDS driver of claim 1 wherein the pre-driver circuit drives the first and second pulsed differential input signals to a de-activating state when no transition is detected on the pair of differential inputs.

3. The LVDS driver of claim 2 wherein the de-activating state is a low voltage that disables current flow in the first and second secondary sourcing transistors and in the first and second secondary sinking transistors.

4. The LVDS driver of claim 1 wherein the pre-driver circuit further comprises:
a pulse generator, receiving the pair of differential inputs, for generating an activating pulse when a transition occurs on the pair of differential inputs, wherein the activating pulse is used by the pre-driver circuit to activate the first or second pulsed differential input signals when the transition occurs.

5. The LVDS driver of claim 4 wherein the pre-driver circuit further comprises:
buffering gates, receiving the activating pulse from the pulse generator, for buffering one of the pair of differential inputs to generate the first or second pulsed differential input signals in an active state.

6. The LVDS driver of claim 5 wherein the buffering gates comprise a NAND gate for each of the first and second pulsed differential input signals.

7. The LVDS driver of claim 1 wherein the primary current source comprises a transistor and a resistor in series.

8. The LVDS driver of claim 1 wherein the primary current source comprises a p-channel transistor having a gate driven by a bias voltage.

9. The LVDS driver of claim 8 wherein the primary current sink comprises an n-channel transistor having a gate driven by a bias voltage.

10. The LVDS driver of claim 9 wherein the bias voltage applied to the gate of the n-channel transistor in the primary current sink and the bias voltage applied to the gate of the p-channel transistor in the primary current source are different bias voltages.

11. The LVDS driver of claim 9 wherein the first and second primary sourcing transistors, the first and second primary sinking transistors, the first and second secondary sourcing transistors, and the first and second secondary sinking transistors each comprise an n-channel transistor, whereby n-channel transistors both sink and source current from the first and second differential outputs.

12. A differential output buffer comprising:
a first differential input and a second differential input that are driven to opposite states during signaling;
a first pulsed differential input and a second pulsed differential input that are both low when no transitions occur on the first and second differential inputs, but when a transition occurs either the first pulsed differential input is pulsed high for a period of time or the second pulsed differential input is pulsed high for the period of time;
a first differential output and a second differential output that are driven to opposite states by the differential output buffer during signaling;
a primary current source;
a primary current sink;
a first primary source transistor having a gate driven by the first differential input, the gate for controlling current flow between the primary current source and the first differential output;
a first primary sink transistor having a gate driven by the second differential input, the gate for controlling current flow between the primary current sink and the first differential output;
a second primary source transistor having a gate driven by the second differential input, the gate for controlling current flow between the primary current source and the second differential output;
a second primary sink transistor having a gate driven by the first differential input, the gate for controlling current flow between the primary current sink and the second differential output;
a secondary current source;
a secondary current sink; a first secondary source transistor having a gate driven by the first pulsed differential input, the gate for controlling current flow between the secondary current source and the first differential output;
a first secondary sink transistor having a gate driven by the second pulsed differential input, the gate for controlling current flow between the secondary current sink and the first differential output;
a second secondary source transistor having a gate driven by the second pulsed differential input, the gate for controlling current flow between the secondary current source and the second differential output; and
a second secondary sink transistor having a gate driven by the first pulsed differential input, the gate for controlling current flow between the secondary current sink and the second differential output.

13. The differential output buffer of claim 12 wherein the first primary source transistor has a drain coupled to the primary current source and a source coupled to the first differential output;
wherein the second primary source transistor has a drain coupled to the primary
current source and a source coupled to the second differential output;

wherein the first primary sink transistor has a drain coupled to the first differential output and a source coupled to the primary current sink;

wherein the second primary sink transistor has a drain coupled to the second differential output and a source coupled to the primary current sink;

wherein the first secondary source transistor has a drain coupled to the secondary current source and a source coupled to the first differential output;

wherein the second secondary source transistor has a drain coupled to the secondary current source and a source coupled to the second differential output;

wherein the first secondary sink transistor has a drain coupled to the first differential output and a source coupled to the secondary current sink;

wherein the second secondary sink transistor has a drain coupled to the second differential output and a source coupled to the secondary current sink.

14. The differential output buffer of claim 13 wherein the first primary source transistor is an n-channel transistor;

wherein the second primary source transistor is an n-channel transistor;

wherein the first primary sink transistor is an n-channel transistor;

wherein the second primary sink transistor is an n-channel transistor;

wherein the first secondary source transistor is an n-channel transistor;

wherein the second secondary source transistor is an n-channel transistor;

wherein the first secondary sink transistor is an n-channel transistor; and wherein the second secondary sink transistor is an n-channel transistor.

15. The differential output buffer of claim 14 wherein the primary current sink is an n-channel transistor having a drain coupled to sources of the first and second primary sink transistors and a gate driven by a bias voltage and a source coupled to a ground;

wherein the primary current source is a source p-channel transistor having a drain coupled to a source resistor and a gate driven by a bias voltage and a source coupled to a power supply;

wherein the source resistor is connected between the drain of the source p-channel transistor and to drains of the first and second primary source transistors.

16. The differential output buffer of claim 14 wherein the primary current sink is an n-channel transistor having a drain coupled to sources of the first and second primary sink transistors and a gate driven by a bias voltage and a source coupled to a ground;

wherein the primary current source is a p-channel transistor having a drain coupled to drains of the first and second primary source transistors and a gate driven by a bias voltage and a source coupled to a power supply.

17. The differential output buffer of claim 16 wherein the secondary current sink is an n-channel transistor having a drain coupled to sources of the first and second secondary sink transistors and a gate driven by a bias voltage and a source coupled to a ground;

wherein the secondary current source is a p-channel transistor having a drain coupled to drains of the first and second secondary source transistors and a gate driven by a bias voltage and a source coupled to a power supply.

18. A differential driver comprising:

pre-driver means, receiving a differential input, for generating a continuous true differential input and a continuous complement differential input that remain in a same state as the differential input;

pulsing means, in the pre-driver means, for generating a transient true pulse on a transient true differential input when the differential input switches to a true state, but for generating a transient complement pulse on a transient complement differential input when the differential input switches to a complement state, and for de-asserting the transient true pulse and the transient complement pulse when the differential input does not switch;

continuous current source means for sourcing a continuous source current;

continuous current sink means for sinking a continuous sink current;

true continuous pull-up transistor means, responsive to the continuous true differential input, for switching the continuous source current to a true differential output;

complement continuous pull-up transistor means, responsive to the continuous complement differential input, for switching the continuous source current to a complement differential output;

true continuous pull-down transistor means, responsive to the continuous complement differential input, for switching the continuous sink current from the continuous true differential output;

complement continuous pull-down transistor means, responsive to the continuous true differential input, for switching the continuous sink current from the complement differential output;

transient current source means for sourcing a transient source current;

transient current sink means for sinking a transient sink current;

true transient pull-up transistor means, responsive to the transient true differential input, for switching the transient source current to the true differential output;

complement transient pull-up transistor means, responsive to the transient complement differential input, for switching the transient source current to the complement differential output;

true transient pull-down transistor means, responsive to the transient complement differential input, for switching the transient sink current from the true differential output; and complement transient pull-down transistor means, responsive to the transient true differential input, for switching the transient sink current from the complement differential output, whereby continuous currents are supplemented by transient currents during switching.

19. The differential driver of claim 18 wherein each transistor means comprises an n-channel transistor and wherein the transient true pulse and the transient complement pulse are each active-high pulses.

20. The differential driver of claim 18 wherein the continuous current source means comprises a transistor or a transistor and a resistor in series;

wherein the transient current source means comprises a transistor or a transistor and a resistor in series.

* * * * *